(12) United States Patent
Zhang et al.

(10) Patent No.: US 9,503,543 B2
(45) Date of Patent: *Nov. 22, 2016

(54) PROXY CACHE AGGREGATOR

(71) Applicant: Facebook, Inc., Menlo Park, CA (US)

(72) Inventors: Li Zhang, Palo Alto, CA (US); Ankush Singla, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,133

(22) Filed: Mar. 10, 2015

(65) Prior Publication Data

US 2015/0189035 A1 Jul. 2, 2015

Related U.S. Application Data

(63) Continuation of application No. 13/756,090, filed on Jan. 31, 2013, now Pat. No. 9,053,155.

(51) Int. Cl.
*G06F 17/30* (2006.01)
*H04L 29/08* (2006.01)

(52) U.S. Cl.
CPC ....... *H04L 67/2842* (2013.01); *G06F 17/3053* (2013.01); *H04L 67/10* (2013.01)

(58) Field of Classification Search
CPC ............... G06F 17/3053; G06F 17/30699; G06F 17/30867; H04L 67/2842; H04L 67/10
USPC ................................ 707/736, 748, 749, 754
See application file for complete search history.

(56) References Cited

U.S. PATENT DOCUMENTS

| | | | |
|---|---|---|---|
| 7,779,014 B2 * | 8/2010 | York | G06Q 30/02 707/727 |
| 8,825,759 B1 * | 9/2014 | Jackson | H04L 67/02 705/14.69 |
| 2012/0066196 A1 * | 3/2012 | Dempski | G06F 17/30864 707/706 |
| 2013/0086078 A1 * | 4/2013 | Malleshaiah | G06Q 30/02 707/748 |
| 2013/0166648 A1 * | 6/2013 | Allard | G06Q 30/0242 709/204 |

* cited by examiner

*Primary Examiner* — Hares Jami
(74) *Attorney, Agent, or Firm* — Fenwick & West LLP

(57) ABSTRACT

A social data aggregator generates entries of action data describing actions taken by users of a social networking system. The entries are archived in a number of remote data hosts, with a portion of the entries stored in an action cache to expedite retrieval. The action cache is modified to include relevant entries of action data by selecting the most relevant entries from proxy data aggregators, which identify sets of entries from remote data hosts coupled to the proxy data aggregators based on the relevance of the entries in the remote data hosts. The relevance of an entry is based on an associated engagement score indicating a likelihood of a user requesting content interacting with a notification based on an entry.

19 Claims, 3 Drawing Sheets

PROXY CACHE AGGREGATOR

CROSS-REFERENCE TO RELATED APPLICATIONS

This application is a continuation of U.S. patent application Ser. No. 13/756,090, filed on Jan. 31, 2013, which is incorporated by reference herein in its entirety.

BACKGROUND

This invention relates generally to data caching, and in particular, to caching data describing actions in a social networking system.

Social networking systems allow users to form connections with other users and to share information with those other users (often called "friends" or "connections"). Examples of shared information include text data, photos, videos, web links, or any other suitable type of information. Information communicated via social networking systems is often distributed from one user to multiple users. For example, a single social networking system user may post a photo for presentation to dozens, hundreds, or even thousands of other users connected to the user.

Additionally, information communicated from a user to other users via the social networking system is typically not a one-time communication like email, but rather is archived for display to users of the social networking system at any time. For example, social networking systems store information about the latest actions performed by users connected to a user, allowing the user to retrieve the stored information at any time. Examples of actions include posting of content such as photos, videos, and text, as well as attending events, dining at restaurants, participating in sports, etc. As any user may potentially be a connection to any other user, storing information for notifying users of actions grows in complexity as the total number of users and the numbers of users connected to other users increase.

As the number of users of social networking systems has continually grown, the task of providing timely and updated notifications of actions to users has grown exponentially. Users are now sharing increasing amounts of information through social networking system users on a daily basis, and each user's information is being shared with an increasing number of additional users. Accordingly, social networking systems face the growing challenge of aggregating relevant information for notifying their users. As a user may be connected to hundreds or even thousands of other users, social networking systems may potentially have to retrieve data from hundreds or even thousands of different data stores to provide a user with recent information about other users connected to the user.

Rather than retrieve data in real-time, some social networking systems provide their users with notifications of actions that do not reflect the most recent actions by social networking system users. Other social networking systems do not even attempt to generate notifications identifying actions of all users connected to a user, but rather notify the user of actions performed by a subset of users connected to the user. However, these approaches to providing notifications do not provide a user with current information about actions taken by users connected to the user.

SUMMARY

A social networking system includes a social data aggregator that receives data from client devices describing actions performed by users operating those client devices. An action logger generates an action log describing the received actions. The data from the action log is stored using a number of distributed remote data hosts, while a subset of the data from the action log is cached in an action cache, which is high performance storage such as a memory-resident database. Data in the action cache is more quickly accessible than other data from the action log, which may be stored in distributed remote data hosts.

When the social data aggregator updates the contents of the action cache, it may request action log data from a set of proxy data aggregators rather than from the remote data hosts. The proxy data aggregators process the data from the remote data hosts and provide the most relevant action data to the social data aggregator, which selects the most relevant action data from the data received from the proxy data aggregators for storage in the action cache. By communicating with the proxy data aggregators instead of directly with the remote data hosts, the social data aggregator reduces both the network traffic in the system and the volume of action data that must be processed to identify the most relevant action log data.

The relevance of action log data is determined at least in part by engagement scores, which measure predicted interaction with data describing actions presented to users. Each proxy data aggregator selects action data to provide to the social data aggregator based at least in part on the engagement scores associated with the action data. Similarly, the social data aggregator selects the data from the proxy data aggregators based at least in part on the engagement scores associated with the action data.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
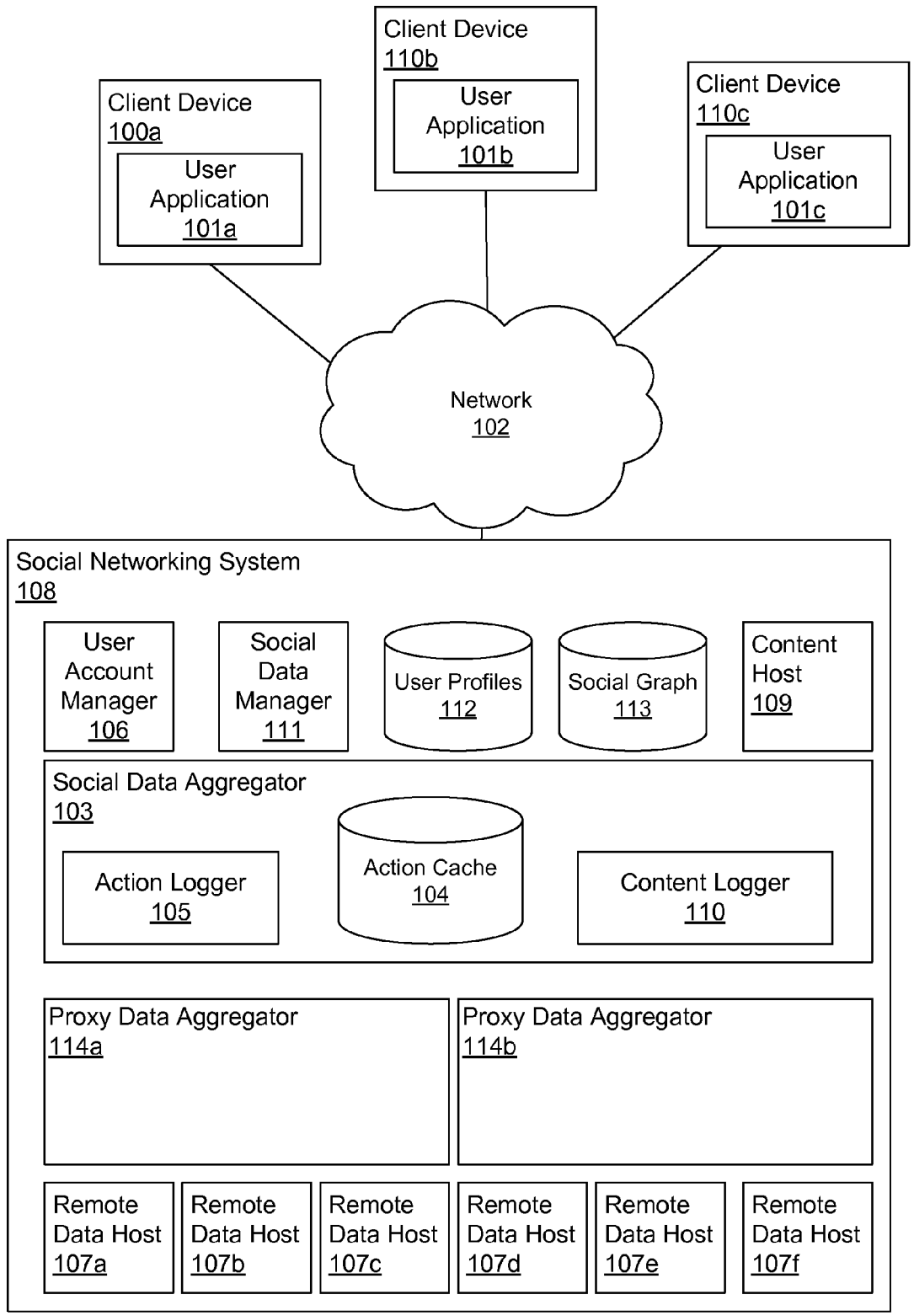
FIG. 1 is a block diagram of a system environment including a social networking system, in accordance with one embodiment.

FIG. 1 shows a block diagram of one embodiment of a system environment including a social networking system 108. The system environment shown by FIG. 1 includes a social networking system 108 connected to one or more client devices 100 via a network 102. In other embodiments, the system environment may include different and/or additional components than those shown by FIG. 1.

The network 102 enables communications between the client devices 100 and the social networking system 108. In one embodiment, the network 102 uses standard communications technologies and/or protocols. Examples of communications technologies used by the network 102 include Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc. In one embodiment the network 102 is the Internet.

The social networking system 108 stores data associated with users and allows users to communicate and interact with each other. For example, the social networking system 108 allows a user to establish an account and a user profile. Users of the social networking system 108 also establish connections with other social networking system users. The users connected to a user may be referred to as the user's "connections" or "friends." The social networking system 108 may present information about a user to that user's connections via a user profile page that displays information from the user profile. A user may create messages or upload content presented to other users through any suitable communication channel, such as through presentation on the user's profile page.

When a user performs actions via the social networking system 108, the social networking system 108 may send a notification to users connected to the user of the actions. Examples of actions include uploading data to the social networking system 108, posting a message to a profile page, posting content to another page of the social networking system 108, checking in at a location, operating an application, or any other suitable type of interaction. A description of each user's activities may be logged by the social networking system 108 as action data. Based on the action data, notifications are generated for communication to users connected to the user performing the actions. The social networking system 108 may also send notifications to users about messages or content from brands, companies, artists, applications, or other entities. These latter notifications are sometimes called "sponsored notifications" or "sponsored stories."

The client devices 100 are computing devices capable of processing data as well as transmitting and/or receiving data via the network 102. Examples of client devices 100 include mobile phones, desktop computers, laptop computers tablet computers, or other suitable devices. The client devices 100 may host one or more user applications 101 allowing users operating a client device 100 to exchange data with the social networking system 108. A user application 101 may be a web application comprising hypertext markup language (HTML) and JAVASCRIPT® code executing in a web browser, a native application executing on an operating system of the client device 101 (e.g., IOS® or ANDROID™), or any other suitable application format.

A user may view notifications received from the social networking system 108 via the user application 101 executing on the client device 100. Notifications may be presented to a user via a newsfeed including stories describing actions performed by other users connected to the user or via any other suitable communication channel. Stories in a newsfeed may describe the most recent actions performed by other users connected to the user and/or actions most likely to be relevant to the user. A story is an aggregation of social data gathered by the social networking system 108 sent to a client device 100 for display to the user. For example, a story is sent to the client device 100 by the social networking system 108 to inform a user about photographs recently uploaded by users connected to the user. In another example, a story may include one or more text summaries describing the actions of users connected to the user viewing the story. A user may interact with a story to request additional information from the social networking system 108 related to the story. The social networking system 108 may determine the relevance of social networking stories to a user before selecting stories to be sent to the client device operated by that user.

In the embodiment shown by FIG. 1, the social networking system 108 comprises a social data aggregator 103, a user account manager 106, social data manager 111, one or more remote data hosts 107, one or more content hosts 109, and one or more proxy data aggregators 114. However, in other embodiments, the social networking system 108 may include different and/or additional components than those shown by FIG. 1.

The user account manager 106 receives information from a user to establish an account with the social networking system 108. Additionally, the user account manager 106 confirms a user's identity when the user subsequently connects to the social networking system 108. Information provided by a user to the social networking system 108 is stored in a corresponding user profile maintained in the user profile store 112. The user account manager 106 may generate a unique identifier for each user that establishes an account with the social networking system 108, and this identifier may be associated with a user's user profile.

The social data manager 111 receives data describing connections between users and objects in the social networking system 108. Examples of objects maintained by the social networking system include content uploaded by users, events, locations, music, movies, or other information. Objects are stored in the social data manager 111 and may have different types. Examples of types of objects included in the social data manager 111 include photo objects, location objects, or other suitable data.

Objects or users may have one or more connections to other objects or users. The social data manager 111 stores information describing a connection as an edge. For example, a user may have a number of edges connected to photo objects including images of that user. In this example, the edges having a type indicating that the user is included in the images. Similarly, location objects may also be connected to photo objects by edges indicating the photos were taken at the locations.

The user profiles, objects and edges stored by the social networking system 108 may form an interconnected graph, or social graph 113, describing users, objects and the connections between objects and/or users. The social graph 113 includes nodes representing objects and users, with the nodes connected by the edges representing the relationships between various objects and/or users. By traversing edges between nodes, the social data manager 111 identifies relationships between objects and/or users. For example, if the social data manager 111 receives a request for photos of a user at a particular location, the social data manager traverses the social graph 113 to identify photo objects that are connected to the user's user profile by edges indicating the user is represented in the photo objects and are also connected to the location object of the identified location by an edge indicating that the photo was taken at the location.

The social data aggregator 103 receives requests for information (such as for notifications) from a client device 100, determines information relevant for a user identified by a request, and sends the determined information to the client device 100. The social data aggregator 103 also receives data from users including uploaded content. Examples of uploaded content include photos, videos, text messages, check-ins, reviews, instant messages, links, or other data. The data received from the users implicitly and explicitly provides information to the social data aggregator 103 describing actions performed by users. Based on the information describing actions performed by the users, the social data aggregator 103 determines the notifications of actions that are relevant for users.

The social data aggregator 103 comprises an action cache 104, an action logger 105, and a content logger 110. The content logger 110 receives content, such as photos, videos, messages, and other data, from users. Content received by the content logger 110 is communicated to the one or more content hosts 109 for storage. The content logger 110 may generate an identifier for each stored item of content and may also track the storage location of each item of content sent to a content host 109. The content logger 110 may also notify the social data manager 111 when new content is received, allowing the social graph 113 to be updated to include a node representing the new content as well as one or more edges to the user that uploaded the content, to users associated with the content, to locations associated with the content, or to other objects associated with the content. This allows the social graph 113 to be updated to include content received by the social networking system 108.

The action logger 105 processes communications from client devices 100 and identifies actions described by the communications. Action data describing actions identified from the communications is stored in one or more remote data hosts 107a, 107b 107c, 107d, 107e, 107f. An entry of action data describes a performed action, a reference to the user that performed the action, a date when the action was taken or captured by the action logger 105, and one or more references to other users or objects associated with the action. For example, if a user, John Smith, uploads a photo to the social networking system 108 in which another user, Jane Doe, is tagged, an entry of action data generated for this action includes one or more of: text or binary data indicating that John Smith has taken a photo of Jane Doe, a reference to the object representing John Smith in the social graph 113, a reference to the object representing Jane Doe in the social graph 113, a reference to an object in the social graph 113 indicating the location where the photo was taken, a reference to the photo stored in the content store 110, a reference to the object representing the photo in the social graph 113, and a date when the photo was taken.

As the action logger 105 generates entries of action data from data received from the client devices 100, these entries are stored in one or more of the remote data hosts 107a, 107b, 107c, 107d, 107e. A subset of the entries is also stored in the action cache 104, which is a storage media configured for more rapid retrieval of data than a remote data host 107; however, the action cache 104 typically has a smaller storage capacity than the remote data hosts 107, so a limited number of entries of action data are stored in the action cache 104. In one embodiment the action cache 104 is a fast memory-resident database where entries of action data are stored in random access memory (RAM). Alternatively, the action cache 104 a database storing data in flash memory. Hence, the social data aggregator 103 retrieves entries of action data from the action cache 104 relevant to a user requesting content. Retrieving entries of action data from the action cache 104 takes less time than searching for entries of action data across the remote data hosts 107.

The entries of action data stored in the action cache 104 are a subset of the action data stored in the remote data hosts 107 that are selected based on their relevance to users. As the relevance of entries of action data changes over time and as new action data is received from users, the social data aggregator 103 modifies the action data store in the action cache 104 to reflect changes in the relevance of entries of action data. To modify the entries of action data in the action cache 104 the social data aggregator 103 sends requests to the one or more proxy data aggregators 114a, 114b. Each proxy data aggregator 114 is associated with a subset of the remote data hosts 107. For example in FIG. 1, the proxy data aggregator 114a is associated with remote data hosts 107a, 107b, 107c, while the proxy data aggregator 114b is associated with remote data hosts 107c, 107d, 107e. A proxy data aggregator 114 selects the most relevant entries of action data from its associated subset of remote data hosts 107, and sends the selected most relevant entries to the social data aggregator 103 when requested. The social data aggregator 103 selects the most relevant entries of action data from entries received from the proxy data aggregators 114 and stores these entries in the action cache 104. Through this multi-level selection process, the most relevant entries of action data from multiple remote data hosts 107 are stored in the action cache 104. Selection of entries of action data for the action cache is further described in conjunction with FIGS. 2 and 3.

Figure 2:
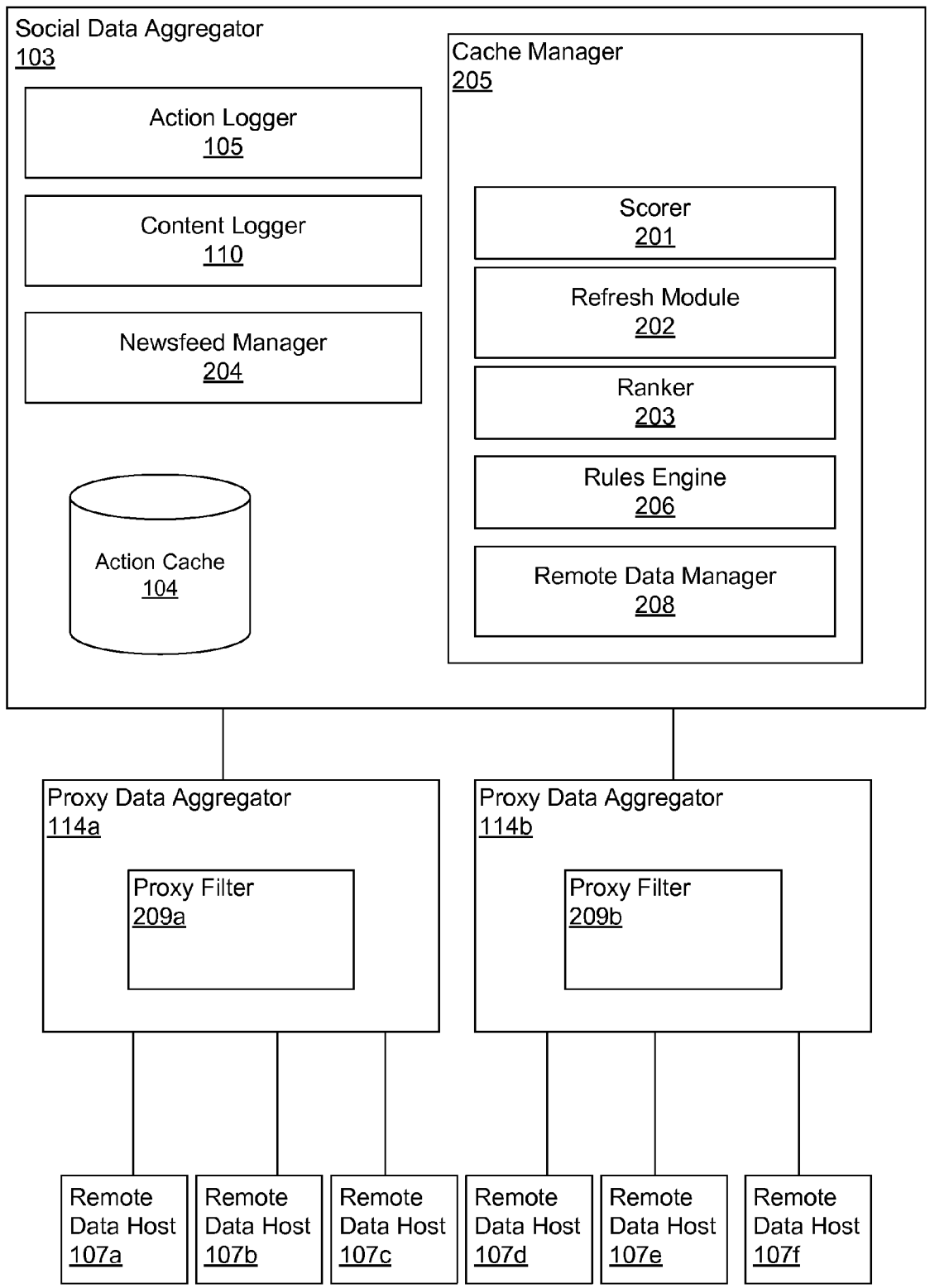
FIG. 2 is a block diagram of a social data aggregator and proxy data aggregators, in accordance with one embodiment.

FIG. 2 is a block diagram of one embodiment of the social data aggregator 103. As shown in FIG. 2, the social data aggregator 130 is coupled to one or more proxy data aggregators 114a, 114b, which are each coupled to subsets of the remote data hosts 107. In the example shown by FIG. 2, proxy data aggregator 114a is coupled to remote data hosts 107a, 107b, 107c, and proxy data aggregator 114b is coupled to remote data hosts 107c, 107d, 107e. In addition to the components described above in conjunction with FIG. 1, the embodiment of the social data aggregator 103 shown by FIG. 2 includes a newsfeed manager 204 and a cache manager 205. The proxy data aggregators 114a, 114b shown in FIG. 2 also include a proxy filter 209. In other embodiments, different and/or additional components may be included in the social data aggregator 103 and proxy data aggregators 114.

The newsfeed manager 204 processes requests for notifications from social networking system users and generates notifications for the requesting social networking system users. To generate notifications, the newsfeed manager 204 requests entries of action data associated with users or objects connected to a requesting user from the cache manager 205. Based on entries of action data received from the cache manager 205, the newsfeed manager 204 generates a newsfeed including stories having information describing the entries of action data. The newsfeed is then sent to a client device 100 from which the request for notification was received for display.

The cache manager 205 ranks, filters, and manages entries of action data stored in the action cache 104. Additionally, the cache manager 205 manages the transfer of entries of action data between the action cache 104 and the proxy caches 115. The cache manager 205 also modifies the entries of action data in the action cache 104 to include the more relevant entries of action data. For example, the cache manager 205 periodically updates the entries of action data included in the action cache 104. In the embodiment shown by FIG. 2, the cache manager 205 comprises a scorer 201, a refresh module 202, a ranker 203, a rules engine 206, and a remote data manager 208.

The scorer 201 determines an engagement score for each entry of action data received by the cache manager 205. Additionally, the scorer 201 determines engagement scores for entries of action data identified by the proxy data aggregators 114 or by the remote data hosts 107. The engagement score is a measure of the predicted level of interaction with a notification describing the entry of action data when displayed to a user requesting the notification.

User interactions with a notification indicate a user's level of interest in the content described by the notification. Examples of interactions with a notification, used to determine an engagement score for an entry of action data included in the notification, include: a user accessing a notification, a user expressing a preference for a notification ("liking" a notification), sharing a notification with another user, requesting data about content of a notification, or other suitable actions.

The engagement score for an entry of action data may be based on both the historical engagement observed for previously presented notifications including the action data as well as the predicted engagement for a notification including the entry of action data. Additional information associated with an entry of action data may be used to determine the engagement score for the entry of action data. Examples of additional information associated with the entry of action data includes: the user that performed the action (an action generated by a user associated with other entries of action data having high engagement scores is also likely to have a high engagement score), users associated with the action (e.g., actions associated with popular users are likely to generate more interactions than actions associated with less popular users), the type of content associated with the action (e.g., photographs and video content are often more popular than text content), the date associated with the action (e.g., newer actions are often more likely to receive interactions than older actions), prior interactions with notifications including the entry of action data, or other suitable data.

Additional information about users or objects associated with an entry of action data may be used to generate an engagement score for the entry. For example, the engagement score may account for an affinity between a user to be presented with a notification and users or objects associated with the entry of action data represented by the notification. The affinity between a user and other users or objects may be included in the social graph 113. For example, the engagement score for an entry of action data accounts for the affinity between the user performing the action and other users connected to the user. Actions performed by users with higher affinities may receive higher engagement scores. Determining affinity between objects in a social networking system 108 is further described in U.S. application Ser. No. 12/978,265, filed on Dec. 23, 2010, which is incorporated by reference herein in its entirety.

The scorer 201 may use a machine-learned model to generate engagement scores based on one or more of the factors mentioned above. By observing the interactions between users and notifications including entries of action data and comparing the observed interactions to predicted engagement scores for entries of action data identified by the notifications, the machine-learned model may be adjusted to improve future scoring. Any suitable machine learning process may be used to modify engagement scores based on observed interactions with notifications.

In one embodiment, the scorer 201 generates engagement scores for entries of action data as they are generated by the action logger 105 and may update the engagement scores based on observed interactions with notifications. Alternatively, the scorer 201 generates engagement scores in response to receiving requests. For example, engagement scores are generated when a trigger event to refresh the action cache 104 is received. The scorer 201 may also generate engagement scores when requests for engagement scores are received from a proxy data aggregator 114 or from a remote data host 107. In one embodiment the scorer 201 also associates a time with engagement scores generated for entries of action data and does not calculate an engagement score for an entry if the time associated with the engagement score is within a threshold period of time from a current time.

The scorer 201 may decay the engagement scores of entries of action data based on the dates associated with the entries of action data. For example, entries of action data associated with dates longer than a threshold time from a current time have their engagement scores lowered or entries of action data associated with dates within a threshold time from the current time have their engagement scores boosted. Time-based biasing of engagement scores is used to manage the entries of action data stored in the action cache 104, as described in more detail below.

The refresh module 202 determines whether to replace one or more entries of action data in the action cache 104 with other stored entries of action data in response to the social networking system 108 receiving a triggering event. Examples of trigger events include receiving a request from a client device for notification data, receiving new action data from a client device, or another suitable event. Alternatively, the trigger event is a signal sent to the refresh module 202 at regular periods. When a trigger event is received, the refresh module 202 requests entries of action data from the proxy data aggregators 114, which identify their most relevant entries of action data to the refresh module 202. The proxy data aggregators select the most relevant entries of action data based on the engagement scores associated with the entries of action data stored in the proxy data aggregators 114. From the entries of action data identified by the proxy data aggregators 114, the refresh module 202 selects and stores the most relevant entries in the action cache 104.

To identify entries of action data to store in the action cache 104, the refresh module 202 uses engagement scores associated with entries of action data received from the proxy data aggregators 114. In one embodiment, the refresh module 202 identifies candidate entries of action data from among the entries received from the proxy data aggregators 114, and selects a subset of the candidate entries for storage in the action cache 104 based on the engagement scores. For example, the candidate entries having the highest engagement scores or having engagement scores above a threshold are selected. In one embodiment, the ranker 203 orders the candidate entries of action data or the entries of action data in received from the proxy data aggregators 114 by engagement score to more easily identify entries for storage in the action cache 104. Engagement scores for entries of action data may be generated after the entries of action data are received from the proxy data aggregators 114 or may be generated for the proxy data aggregators 114 before entries of action data are sent to the social data aggregator 103. The ranker 203 may update the rankings of entries of action data as new entries are received from the proxy data aggregators and as engagement scores of action entries are updated.

In one embodiment, the refresh module 202 selects candidate entries of action data based on application-specific rules executed by a rules engine 206. For example, application-specific rules identify entries of action data for prioritizing based on application-specific criteria and the refresh module 202 identifies entries that are prioritized as candidate entries of action data. A subset of candidate entries are selected based on the engagement scores of the candidate entries of action data; hence a limited number of entries of action data received from the proxy data aggregators 114 are stored in the action cache 104 when the action cache 104 is refreshed. For example, if the social data aggregator 103 serves notifications to a user application 101 for viewing photos, application-specific rules may prioritize entries of action data related to photos over entries including other types of action data, allowing the refresh module 202 to initially store entries of action data related to photos in the action cache 104.

The refresh module 202 may use additional information to select candidate entries of action data. For example, the refresh module 202 may use a date associated with entries of action data to identify candidate entries if the rules engine 206 identifies more than a threshold number of candidate entries. For example, in the preceding photo application example, if more than a threshold number of candidate entries of action data associated with photos are identified, entries of action data associated with photographs associated with the newest dates are selected as candidate entries over those associated with older dates. This may store entries of action data in the action cache 104 associated with photos that have the newest dates and highest engagement scores from the entries received from the proxy data aggregators 114.

The remote data manager 208 receives entries of action data from the one or more proxy data aggregators 114 and sends entries of action data for storage in the remote data hosts 107. When the refresh module 202 identifies entries of action data to remove from the action cache 104, the remote data manager 208 determines if the identified entries of action data are stored in a remote data host 107. If the identified entries of action data are not stored in a remote data host 107, the remote data manager 208 sends the identified entries of action data to a remote data host 107 for storage. This allows entries of action data to be retained even after being removed from the action cache 104.

In the embodiment illustrated in FIG. 2, the proxy data aggregators 114 each include a proxy filter 209, which identifies a proxy set of entries of action data from the subset of remote data hosts 107 connected to the proxy data aggregator 114. For example, proxy filter 209a generates a proxy set of entries from entries of action data stored in remote hosts 107a, 107b, 107c, and proxy filter 209b generates a proxy set of entries of action data stored in remote hosts 107d, 107e, 107f. The proxy set is based on engagement scores associated with entries of action data in the remote hosts 107 and is sent to the social data aggregator 103 when entries of action data for storage in the action cache 104 are requested.

In one embodiment, a proxy filter 209 selects entries of action data from remote data hosts 107 based on their engagement scores. The proxy filter 209 may request scores for entries of action data from the scorer 201 or the scores may be locally-generated by the proxy filter 209 in a method analogous to that used by the scorer 201. In some embodiments, the proxy filter 209 may execute application-specific rules to prioritize entries of action data for selection, similar to the functionality of the rules engine 206 described above. These prioritized entries have an increased likelihood of being included in the proxy set. In one embodiment, the proxy set includes entries of action data from the remote hosts 107 having at least a threshold engagement score.

A proxy set of entries of action data may be generated in response to a request for entries received from the social data aggregator 103. Alternatively, a proxy set of entries is generated or updated as new entries are stored in one or more of the subset of remote data hosts 107 associated with the proxy data aggregator 114 including a proxy filter 209. In a different embodiment, the proxy set of entries is periodically generated.

Modifying Cached Entries of Action Data

Figure 3:
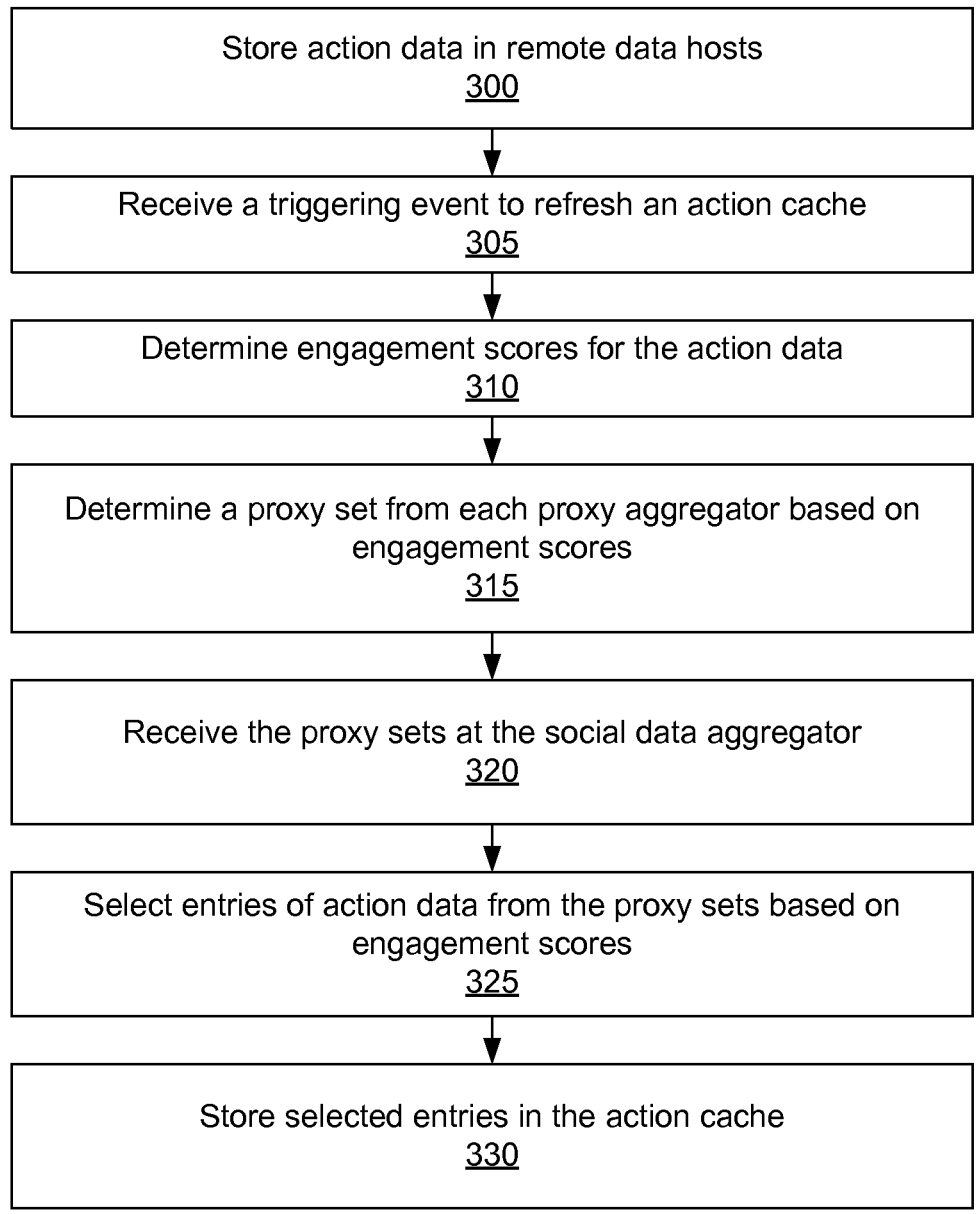
FIG. 3 is a flow chart of a process for refreshing an action cache, in accordance with one embodiment.

FIG. 3 is a flow chart of one embodiment of a process for modifying entries of action data in the action cache 104. As described above, the social networking system 108 stores a plurality of entries of action data in the remote data hosts 107. In one embodiment, each remote data host includes a subset of the plurality of entries of action data. Each the remote data hosts 107 is associated with a proxy data aggregator 114.

The refresh module 202 receives 305 a triggering event to refresh the action cache 104. As described above, the triggering event may be receiving a request from a client device 110 for notification data, receiving new action data from a client device 110, or a signal received by the refresh module 202, or any other suitable event. Engagement scores are determined 310 for the entries of action data in the action cache 104 and in the remote data hosts 107. The engagement score of an entry of action data may be determined 310 when it is captured by the action logger 105, when it is retrieved from a remote data host 107 by a proxy data aggregator 114, or when it is received by the cache manager 205. In various embodiments, engagement scores may be determined 310 before or after the trigger event is received 305

A proxy set of entries of action data is then determined 315 for each proxy data aggregator 114 by selecting entries of action data from the remote data hosts 107 associated with a proxy data aggregator 114 based on their associated engagement scores. In one embodiment a proxy filter 209 included in a proxy data aggregator 114 applies application-specific rules to entries of action data in the remote hosts 107 connected to the proxy data aggregator 114 and selects the proxy set based on application of the application-specific rules and the engagement scores. As described above, the application-specific rules may prioritize specific entries, so the proxy set is selected based at least in part based on the prioritization.

The social data aggregator 103 receives 320 the proxy sets from each proxy data aggregator 114 and selects 325 entries of action data from the proxy sets based on engagement scores associated with the entries of action data. In one embodiment the rules engine 206 executes application-specific rules and uses the results of the application-specific rule application and engagement scores to select 325 entries of action data, as described above. The selected entries of action data are then stored 330 in the action cache 104.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a triggering event to modify an action cache;
   receiving a plurality of proxy sets, the proxy sets being received from a plurality of proxy data aggregators, each proxy set including entries of action data, a respective entry of action data being stored in one of a plurality of remote data hosts and describing an action performed by a user of a social networking system, each proxy set being determined by a proxy data aggregator based on engagement scores of entries of action data stored in one or more remote data hosts coupled to the proxy data aggregator;
   selecting entries of action data from the plurality of proxy sets based on the engagement scores associated with the entries of action data; and
   storing the selected entries of action data in the action cache.

2. The method of claim 1, wherein the engagement score for an entry of action data is based at least in part on prior interactions with a notification based on the entry by users of the social networking system.

3. The method of claim 1, wherein the engagement score for an entry of action data is based at least in part on an affinity between a user requesting a notification and an object associated with the entry of action data.

4. The method of claim 1, further comprising determining the engagement score for each of the entries of action data by:
   capturing interactions with a notification based on an entry by one or more users of the social networking system; and
   modifying an engagement score of the entry based on the captured interactions.

5. The method of claim 1, wherein the engagement scores are determined responsive to receiving the information about the triggering event.

6. The method of claim 1, wherein the trigger event comprises receiving a request from a client device for notification data.

7. The method of claim 1, wherein the trigger event comprises receiving action data from a client device.

8. The method of claim 1, wherein the trigger event comprises a signal generated at a defined time interval.

9. A method comprising:
   receiving a triggering event to modify an action cache;
   receiving a plurality of proxy sets, the proxy sets being received by a plurality of proxy data aggregators, each proxy set including entries of action data, a respective entry of action data being stored in one of a plurality of remote data hosts and describing an action performed by a user of a social networking system, each proxy set being determined by a proxy data aggregator based on engagement scores of entries of action data stored in one or more remote data hosts coupled to the proxy data aggregator;
   applying one or more rules to the entries stored in each of the plurality of proxy sets to identify one or more candidate entries of action data;
   selecting one or more entries of action data from the candidate entries of action data based at least in part on the engagement scores; and
   storing the selected one or more entries of action data in the action cache.

10. The method of claim 9, wherein applying one or more rules to the entries stored in each of the plurality of proxy sets to identify one or more candidate entries of action data comprises:
    prioritizing entries stored in at least one proxy set based on application of the one or more rules; and
    identifying the one or more candidate entries based at least in part on the prioritization.

11. The method of claim 9, wherein the engagement score for an entry of action data is based at least in part on prior interactions with a notification based on the entry by users of the social networking system.

12. The method of claim 9, wherein the engagement score for an entry of action data is based at least in part on an affinity between a user requesting a notification and an object associated with the entry of action data.

13. The method of claim 9, wherein further comprising determining the engagement score for each of the entries of action data by:
    capturing interactions with a notification based on an entry by one or more users of the social networking system; and
    modifying an engagement score of the entry based on the captured interactions.

14. The method of claim 9, wherein the engagement scores are determined responsive to receiving the information about the triggering event.

15. The method of claim 9, wherein the trigger event comprises receiving a request from a client device for notification data.

16. The method of claim 9, wherein the trigger event comprises receiving action data from a client device.

17. The method of claim 9, wherein the trigger event comprises a signal generated at a defined time interval.

18. A non-transitory computer-readable medium containing instructions for execution on a processor, the instructions when executed causing the processor to perform steps of:
receiving a triggering event to modify an action cache;
receiving a plurality of proxy sets, the proxy sets being received from a plurality of proxy data aggregators, each proxy set including entries of action data, a respective entry of action data being stored in one of a plurality of remote data hosts and describing an action performed by a user of a social networking system, each proxy set being determined by a proxy data aggregator based on engagement scores of entries of action data stored in one or more remote data hosts coupled to the proxy data aggregator;
selecting entries of action data from the plurality of proxy sets based on the engagement scores associated with the entries of action data; and
storing the selected entries of action data in the action cache.

19. A non-transitory computer-readable medium containing instructions for execution on a processor, the instructions when executed causing the processor to perform steps of:
receiving a triggering event to modify an action cache;
receiving a plurality of proxy sets, the proxy sets being received by a plurality of proxy data aggregators, each proxy set including entries of action data, a respective entry of action data being stored in one of a plurality of remote data hosts and describing an action performed by a user of a social networking system, each proxy set being determined by a proxy data aggregator based on engagement scores of entries of action data stored in one or more remote data hosts coupled to the proxy data aggregator;
applying one or more rules to the entries stored in each of the plurality of proxy sets to identify one or more candidate entries of action data;
selecting one or more entries of action data from the candidate entries of action data based at least in part on the engagement scores; and
storing the selected one or more entries of action data in the action cache.

* * * * *